United States Patent Office
3,647,780
Patented Mar. 7, 1972

3,647,780
α-(α-CARBOXYACYLAMINO) ARALKYL-PENICILLINS
Kenneth David Hardy, Horsham, Sussex, England, assignor to Beecham Group Limited, Middlesex, England
No Drawing. Continuation of abandoned application Ser. No. 792,139, Jan. 17, 1969. This application Mar. 23, 1970, Ser. No. 20,457
Claims priority, application Great Britain, Jan. 19, 1968, 2,968/68
Int. Cl. C07d 99/16
U.S. Cl. 260—239.1    7 Claims

ABSTRACT OF THE DISCLOSURE

α-(α-Carboxyacylamino)-aralkyl penicillins having activity against micro-organisms of the genus Pseudomonas are described. The penicillins have the formula:

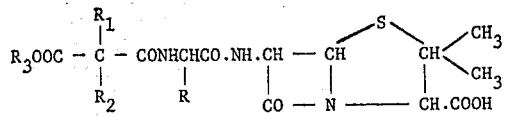

or a pharmaceutically acceptable non-toxic salt thereof wherein

R is phenyl or thienyl,
$R_1$ is lower alkyl, phenyl, benzyl, phenoxy, benzyloxy, carboxyphenyl or carboxybenzyl,
$R_2$ is hydrogen or lower alkyl and
$R_3$ is hydrogen, lower alkyl, phenyl or benzyl, and a typical compound is D-α-[α-(benzyloxycarbonyl)β-phenylpropionamido]-benzylpenicillin.

---

This application is a streamlined continuation of Ser. No. 792,139, filed Jan. 17, 1969, now abandoned.

This invention relates to new penicillins.

In our U.S. Pat. No. 3,320,240 we have described and claimed new penicillins of the general formula:

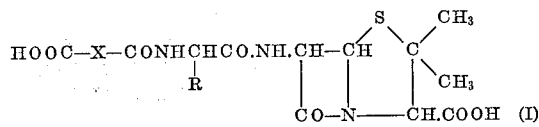

and non-toxic salts thereof, where R is an alkyl, aralkyl, aryl or heterocyclic group which may be substituted and X is a direct linkage or a divalent aliphatic, aromatic or heterocyclic radical which may be substituted.

These compounds are of value as antibacterial agents, as nutritional supplements in animal food, as agents for the treatment of mastitis in cattle and as therapeutic agents in poultry and animals, including man, in the treatment especially of infectious diseases caused by Gram-positive and Gram-negative bacteria.

We have now found that certain compounds related to the general Formula I above have particularly desirable properties especially in respect of their activity against certain micro-organisms of the genus Pseudomonas.

Accordingly, the present invention provides penicillins of the general formula:

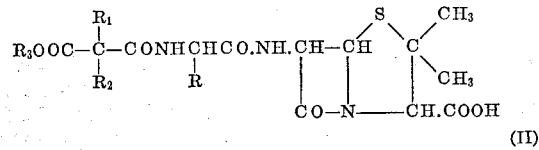

and non-toxic salts thereof, where R is a phenyl or thienyl group, $R_1$ is an alkyl, aryl, aralkyl, aryloxy or heterocyclic group, $R_2$ is a hydrogen atom or an alkyl group and $R_3$ is a hydrogen atom or an alkyl, aryl or aralkyl group.

The salts are non-toxic salts including non-toxic metallic salts such as sodium, potassium, calcium and aluminium, ammonia and substituted ammonium salts, e.g. salts of such non-toxic amines, as trialkylamines, including triethylamine, procaine, dibenzylamine, N-benzyl-beta-phenethylamine, 1-ephenamine, N,N'-dibenzylethylenediamine, dehydroabietylamine, N,N'-dehydroabietylethylenediamine and other amines which have been used to form salts with benzylpenicillin.

The penicillins of the present invention as hereinbefore defined other than those where $R_3$ is a hydrogen atom, i.e. the α(α-alkoxycarbonylacylamino)aralkyl penicillins are preferably prepared by reacting an α-aminopenicillin of the general formula:

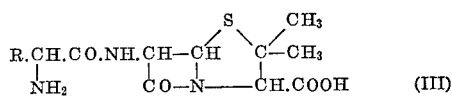    (III)

with a reactive derivative of the carboxylic acid

    (IV)

where R is a phenyl or thienyl group, $R_1$ is an alkyl, aryl, aralkyl, aryloxy or heterocyclic group, $R_2$ is a hydrogen atom or an alkyl group and $R_3$ is an alkyl, aryl or aralkyl group. The reactive derivative is preferably the acid chloride.

The α-aminopenicillin (III) may be employed in either epimeric modification or as the DL-mixture, but in general the D-epimers are found to give the most active products.

The α - (α - carboxyacylamino)aralkylpenicillins (II; $R_3$=H) may be prepared by the catalytic hydrogenation of the corresponding benzyl esters (II; $R_3$=CH$_2$Ph). Alternatively, they may be prepared by mild alkaline hydrolysis of the corresponding aryl esters (II; $R_3$=aryl).

In general the α(α-carboxyacylamino)aralkylpenicillins in which the α-carbon atom of the side chain has the D-configuration tend to be more active than those having the L-configuration.

The following examples illustrate the invention, the activity of the penicillins being shown by the minimum inhibitory concentrations (M.IC.'s) against two strains of *Pseudomonas pyocyaneus*, "A" and "R.59."

EXAMPLE 1

(a) Monobenzyl benzylmalonate

Benzylmalonic acid (0.7 g., 0.05 mol.) was mixed with dry ether (40 ml.) and treated with thionyl chloride (5.95 g., 3.63 ml., 0.05 mol.) and dimethylformamide (1 drop). The mixture was refluxed for 3 hours on a hot water bath and the solvent evaporated under reduced pressure. The residue was dissolved in fresh dry ether (40 ml.), benzyl alcohol (5.4 g., 5.06 ml., 0.05 ml.) was added all at once, and the mixture refluxed for a further 2 hours. The reaction was cooled to room temperature, washed with water (12.5 ml.) and extracted with saturated sodium bicarbonate solution until the extracts were alkaline. The combined aqueous extracts were washed with ether (50 ml.) and acidified with 5 N hydrochloric acid. The precipitated oil was extracted exhaustively with methylene chloride. The combined organic extracts were washed thoroughly with water (6× 60 ml.), dried over anhydrous magnesium sulphate and evaporated. The oily residue crystallised and was recrystallised from benzene/60°–80° petroleum ether to give a colourless crystalline solid 7 g. (41.3%) M.P.

62 to 64° C. Found: C, 71.12; H, 5.61. $C_{17}H_{16}O_4$ requires C, 71.81; H, 5.67.

(b) D-α[α-(benzyloxycarbonyl)β-phenylpropionamido] benzylpenicillin sodium salt

Monobenzyl benzylmalonate (2.84 g., 0.01 mol.) was mixed with thionyl chloride (10 ml.) and heated in a water bath at 75° C. for 1 hour. The excess thionyl chloride was evaporated under reduced pressure. The residue was dissolved in dry benzene (5 ml.) and again evaporated to dryness to remove any residual thionyl chloride. The final residue was dissolved in dry acetone (50 ml.) and added, with stirring, to a solution of D-α-aminobenzyl penicillin trihydrate (4.03 g., 0.01 mol.) in water (50 ml.), N. sodium hydroxide (10 ml.), N sodium bicarbonate 15 ml.) and acetone (25 ml.), cooled to 12° C. The reaction mixture was stirred at room temperature for 2 hours. The resulting solution was extracted with ether (3× 30 ml.) and the extracts discarded. The aqueous layer was covered with ether (30 ml.) and acidified with N hydrochloric acid to pH 1.5. The ether layer was separated and the aqueous layer extracted with further ether (2× 30 ml.). The combined ether extracts were washed with water (10 ml.) and extracted with N sodium bicarbonate solution to pH 7. The neutral aqueous extract was evaporated under reduced temperature and pressure. The residue was dried over phosphorus pentoxide in vacuo to give 5.8 g. (91.1%) of the penicillin sodium salt as an amorphous solid. M.I.C. (μg./ml.) *Pseudomonas pyocyaneus* A.50; *Pseudomonas pyocyaneus* R.59.25.

(c) D-α-(α-carboxy-β-phenylpropionamido)benzylpenicillin disodium salt

Sodium D-α-[α-(benzyloxy-carbonyl)β-phenylpropionamido]benzylpenicillin (3 g.) dissolved in water (100 ml.) was added to a pre-hydrogenated mixture of 5% palladium on calcium carbonate (9 g.) in water (50 ml.) and hydrogenated under positive pressure until no more hydrogen was absorbed. The mixture was filtered through Celite. The filtrate was shaken with ether (30 ml.) and acidified with N hydrochloric acid to pH 2. The ether layer was separated and the aqueous layer extracted with further ether (2× 30 ml.). The combined ether extracts were washed with water (10 ml.) and extracted with N sodium bicarbonate solution to pH 7. The neutral aqueous extracts were evaporated under reduced pressure and temperature. The residue was dried over phosphorus pentoxide in vacuo to give 1.5 g. (56%) of the penicillin di-sodium salt as an amorphous solid. M.I.C. (μg./ml.) *Pseudomonas pyocyaneus* A.50; *Pseudomonas pyocyaneus* R.59.50.

EXAMPLE 2

(a) D-α-[α(benzyloxycarbonyl)phenylacetamido] benzylpenicillin sodium salt

Monobenzyl phenylmalonate (5.4 g. 0.01 mol.) was converted to the acid chloride and reacted with D-α-aminobenzylpenicillin trihydrate (8.06 g. 0.02 mol.) as in Example 1(b) to give 11 g. (88.3%) of the penicillin sodium salt. M.I.C. (μg/ml.) *Pseudomonas pyocyaneus* A.50; *Pseudomonas pyocyaneus* R.59.50.

(b) D-α-(α-carboxyphenylacetamido)benzylpenicillin disodium salt

D - [α - (benzyloxycarbonyl)phenylacetamido]benzylpenicillin sodium salt was reduced as described in Example 1(c) to give 2.1 g. (94.3%) of the penicillin disodium salt as a colourless amorphous solid. M.I.C. (μg/ml.) *Pseudomonas pyocyaneus* A.50; *Pseudomonas pyocyaneus* R.59.25.

EXAMPLE 3

(a) The following acids having the general Formula IV were prepared as described in Example 1(a).

| | | | Yield, percent | M.P., °C. | Analysis | | | | | |
|---|---|---|---|---|---|---|---|---|---|---|
| | | | | | Found | | | Calculated | | |
| $R^1$ | $R^2$ | $R^3$ | | | C | H | S | C | H | S |
| Ph | Me | $CH_2Ph$ | 70 | 76-78 | 71.0 | 5.82 | | 71.8 | 5.67 | |
| $CH_3(CH_2)_3$ | H | $CH_2Ph$ | 65.5 | Oil | | | | | | |
| 3-thienyl | H | $CH_2Ph$ | 38.8 | 91-92 | 60.0 | 4.40 | 11.2 | 60.8 | 4.35 | 11.6 |
| PhO | H | $CH_2Ph$ | 26.6 | 89-91 | 67.1 | 4.94 | | 67.1 | 4.93 | |
| $PhCH_2$ | H | Ph | 37 | 59-61 | 69.8 | 5.22 | | 71.1 | 5.22 | |
| Ph | H | $C_6H_4CO_2CH_2Ph(o)$ | 27.4 | 106-8 | 70.0 | 4.51 | | 70.7 | 4.65 | |
| $pCH_3OC_6H_4CH_2$ | H | $CH_2Ph$ | 26.4 | 58-60 | 68.1 | 5.78 | | 68.8 | 5.77 | |
| $pClC_6H_4CH_2$ | H | $CH_2Ph$ | 65 | 81-82 | 63.2 | 4.73 | | 64.0 | 4.74 | |
| Ph | H | $C_2H_5$ | 48.5 | 74-76 | | | | | | |
| Ph | H | $CH(CH_3)_2$ | 62 | 64-66 | 65.0 | 6.38 | | 64.9 | 6.35 | |
| 3-thienyl | H | $CH(CH_3)_2$ | 53 | 82-83 | 52.7 | 5.27 | 14.1 | 52.6 | 5.3 | 14.1 |

(b) The resultant acid chlorides of the above acids were used to acylate D-α-aminobenzylpenicillin as described in Example 1(b) to give respectively the following penicillins of the general Formula II:

| | | | | | Yield, percent | M.I.C. (μg./ml.) | |
|---|---|---|---|---|---|---|---|
| | | | | | | *Pseudomonas pyocyaneus* | |
| R | $R^1$ | $R^2$ | $R^3$ | | | A. | R.59 |
| Ph | Ph | Me | $CH_2Ph$ | | 90.3 | 250 | 125 |
| Ph | $CH_3(CH_2)_3$ | H | $CH_2Ph$ | | 90.2 | 125 | 250 |
| Ph | 3-thienyl | H | $CH_2Ph$ | | 50 | 50 | 125 |
| Ph | PhO | H | $CH_2Ph$ | | 82.2 | 50 | 50 |
| Ph | $PhCH_2$ | H | Ph | | 71.6 | 50 | 50 |
| Ph | Ph | H | $C_6H_4CO_2CH_2Ph(o)$ | | 54.5 | 125 | 50 |
| Ph | $pCH_3OC_6H_4CH_2$ | H | $CH_2Ph$ | | 79.3 | 125 | 125 |
| Ph | $pClC_6H_4CH_2$ | H | $CH_2Ph$ | | 49.2 | 125 | 50 |
| Ph | Ph | H | $C_2H_5$ | | 56.0 | 125 | 125 |
| Ph | Ph | H | $CH(CH_3)_2$ | | 83.8 | 500 | 500 |
| Ph | 3-thienyl | H | $CH(CH_3)_2$ | | 63.1 | 500 | 500 |

(c) Subsequently those penicillins having $R_3=CH_2Ph$ were reduced as described in Example 1(c) and the corresponding penicillins having $R_3=H$ were isolated as the di-sodium salts as follows:

| | | | | | M.I.C. (μg/ml.) | |
|---|---|---|---|---|---|---|
| | | | | | *Pseudomonas pyocyaneus* | |
| R | R¹ | R² | R³ | Yield, percent | A. | R.59 |
| Ph | Ph | Me | Na | 78.4 | 125 | 125 |
| Ph | CH₃(CH₂)₃ | H | Na | 75.2 | 125 | 125 |
| Ph | 3-thienyl | H | Na | 82.2 | 50 | 50 |
| Ph | PhO | H | Na | 62.7 | 125 | 50 |
| Ph | pCH₃OC₆H₄CH₂ | H | Na | 36.2 | 125 | 250 |

EXAMPLE 4

(a) L-α-[α(benzyloxycarbonyl)phenylacetamido]benzylpenicillin sodium salt

L-α-aminobenzylpenicillin was acylated with monobenzyl phenylmalonyl chloride as described in Example 1(b) to give 2.95 g. (47.3%) of the penicillin sodium salt. M.I.C. (μg./ml.) *Pseudomonas pyocyaneus* A.>500. *Pseudomonas pyocyaneus* R.59.500.

(b) L-α-(α-carboxyphenylacetamido)benzylpenicillin disodium salt

The benzyl ester penicillin (2 g.) from 4(a) was reduced as described in Example 1(c) to give 0.98 g. (55%) of the penicillin disodium salt. M.I.C. (μg./ml.) *Pseudomonas pyocyaneus* A.125; *Pseudomonas pyocyaneus* R.59.125.

EXAMPLE 5

(a) α[α(Benzyloxycarbonyl)phenylacetamido]2-thienylmethylpenicillin sodium salt

α-Amino 2-thienyl methylpenicillin [epimer derived from α-amino-2-thienylacetic acid with $[\alpha]_D^{20}$—74° (c.=1.H₂O)] was acylated with monobenzyl phenylmalonyl chloride as described in Example 1(b) to give 4 g. (61.4%) of the penicillin sodium salt. M.I.C. (μg./ml.) *Pseudomonas pyocyaneus* A.125; R.59.125.

(b) α(α-Carboxyphenylacetamido)2-thienylmethylpenicillin disodium salt

The benzyl ester penicillin (2 g.) from 5(a) was reduced as described in Example 1(c) to give 1.7 g. (94.9%) of the penicillin di-sodium salt. M.I.C. (μg./ml.) *Pseudomonas pyocyaneus* A.125; R.59.125.

What is claimed is:
1. A penicillin of the formula:

$$R_3OOC-\underset{\underset{R_2}{|}}{\overset{\overset{R_1}{|}}{C}}-\underset{\underset{R}{|}}{CONHCHCO.NH.CH}-\underset{\underset{CO-N}{|}}{CH}\underset{}{\overset{S}{\diagup}}\underset{CH.COOH}{\overset{}{\diagdown}}CH\overset{CH_3}{\underset{CH_3}{\diagup}}$$

or a pharmaceutically acceptable non-toxic salt thereof wherein
R is phenyl or thienyl,
R₁ is lower alkyl, phenyl, benzyl, phenoxy, benzyloxy, carboxyphenyl or carboxybenzyl,
R₂ is hydrogen or lower alkyl and
R₃ is hydrogen, lower alkyl, phenyl or benzyl.

2. The penicillin of claim 1 which is D-α-[α-(benzyloxycarbonyl)β-phenylpropionamido]-benzylpenicillin or a pharmaceutically acceptable non-toxic salt thereof.

3. The penicillin of claim 1 which is D-α(α-carboxy-β-phenylpropionamido)benzylpenicillin or a pharmaceutically acceptable non-toxic salt thereof.

4. The penicillin of claim 1 which is D-α-[α(benzyloxycarbonyl)phenylacetamido]benzylpenicillin or a pharmaceutically acceptable non-toxic salt thereof.

5. The penicillin of claim 1 which is D-α-(α-carboxyphenylacetamido)benzylpenicillin or a pharmaceutically acceptable non-toxic salt thereof.

6. The penicillin of claim 1 which is D-α-[α-benzyloxycarbonyl)phenoxyacetamido]benzylpenicillin or a pharmaceutically acceptable non-toxic salt thereof.

7. The penicillin of claim 1 which is D-α-(α-carboxyphenoxyacetamido)benzylpenicillin or a pharmaceutically acceptable non-toxic salt thereof.

References Cited

UNITED STATES PATENTS 3,320,240   5/1967   Fosker et al. _____ 260—239.1

NICHOLAS S. RIZZO, Primary Examiner

U.S. Cl. X.R.

424—271